United States Patent [19]

Russ, Sr.

[11] 3,747,995
[45] July 24, 1973

[54] REINFORCEMENT FOR ENDLESS TRACK
[75] Inventor: Paul E. Russ, Sr., Denver, Colo.
[73] Assignee: The Gates Rubber Company, Denver, Colo.
[22] Filed: July 12, 1971
[21] Appl. No.: 161,679

[52] U.S. Cl. .......................................... 305/35 EB
[51] Int. Cl. ............................................ B62d 55/24
[58] Field of Search ..................... 305/35 EB, 38; 152/209, 210, 211

[56] References Cited
UNITED STATES PATENTS

| 3,463,562 | 8/1969 | Svensson | 305/38 |
| 3,664,715 | 5/1972 | Huber | 305/38 |
| 3,680,925 | 8/1972 | Spivy | 305/24 |
| 3,598,454 | 8/1971 | Richards | 305/35 EB |
| 3,120,409 | 2/1964 | Beall | 305/38 X |
| 2,899,242 | 8/1959 | Bombardier | 305/38 |
| 3,205,023 | 9/1965 | Nodwell | 305/38 |
| 3,623,780 | 11/1971 | Kell | 305/38 |

OTHER PUBLICATIONS

Advertising Brochure, Larven Motorized Skiing Published for Lenko Ostersund, Sweden 1968.
Moto–Ski–Advertising Brochure page 6 received in Patent Office 8/20/69 LaPocatiere, P.Q. Can.

*Primary Examiner*—Richard J. Johnson
*Attorney*—Raymond Fink et al.

[57] ABSTRACT

A transverse reinforcement for stiffening an endless track of the textile reinforced polymeric type, the transverse reinforcement having a generally horseshoe cross-section that interlocks the stiffener within the track.

4 Claims, 11 Drawing Figures

Patented July 24, 1973 3,747,995

INVENTOR.
PAUL E. RUSS SR.
BY H. H. Oberg Jr.
ATTORNEY

REINFORCEMENT FOR ENDLESS TRACK

BACKGROUND OF THE INVENTION

The invention relates to wheel substitutes for land vehicles, but more particularly, the invention relates to a non-metallic track or tread having an embedded reinforcement therein.

It is recognized as being advantageous to stiffen endless track or tread with a plurality of spaced-apart and transversely oriented reinforcement members. The members stiffen the track to provide a generally flat platform for supporting a wheel substitute land vehicle such as a snowmobile.

Examples of such reinforcement members may be found in U. S. Pat. Nos.; 2,899,242 as issued to Bomardier; U.S. Pat. No. 3,285,677 as issued to Marier; and U.S. Pat. No. 3,436,128 as issued to Boulanger. While the prior art reinforcement members may impart a desired transverse stiffness to a track, there are recognized limitations associated with their configurations. The metal reinforcement members may become permanently distorted or become dislodged. Polymeric material adjacent to an embedded rod such as depicted in U. S. Pat. No. 2,899,242 is easily torn or "chunked" away from the rod. Should too much material be torn away, the rod may become partially dislodged. Exposure of the rod may result in damage to concrete or asphalt pavements during track usage. Another disadvantage associated with metal rods is their weight. Metal rods increase the weight and inertia of a track. More power is required to propell such a track. Also, the prior art rods are not adapted to accommodate twisting moments which may be locally induced across the width of the track.

SUMMARY OF THE INVENTION

In accordance with the invention, a reinforcement member or rod is provided for transversely stiffening an endless track of the textile reinforced polymeric type. The rod has a generally horseshoe cross-section that mechanically interlocks it within the polymer of the track. The mechanical interlock feature advantageously helps retain the rod in position within the track and substantially reduces "chunking" of adjacent polymeric material. The cross-sectional shape of the rod permits it to be torsionally flexed which further reduces "chunking" of the track polymeric material.

Accordingly, it is an object of the invention to provide an interlocking reinforcing rod for a polymeric track.

Another object of the invention is to provide a rod which does not permanently set when the yield point of the material is reached.

A further object of the invention is to provide a reinforcing member capable of being torsionally deflected within the polymeric body of a track without seriously affecting the bond between the track and member.

Still another object of the invention is to provide a reinforcing member whose shape permits it to be readily inserted in a track having a commonly desirable tread pattern.

These and other objects or advantages of the invention will become apparent by reviewing the drawings and description thereof wherein.

DESCRIPTION OF PREFERRED EMBODIMENT

Figure 1:
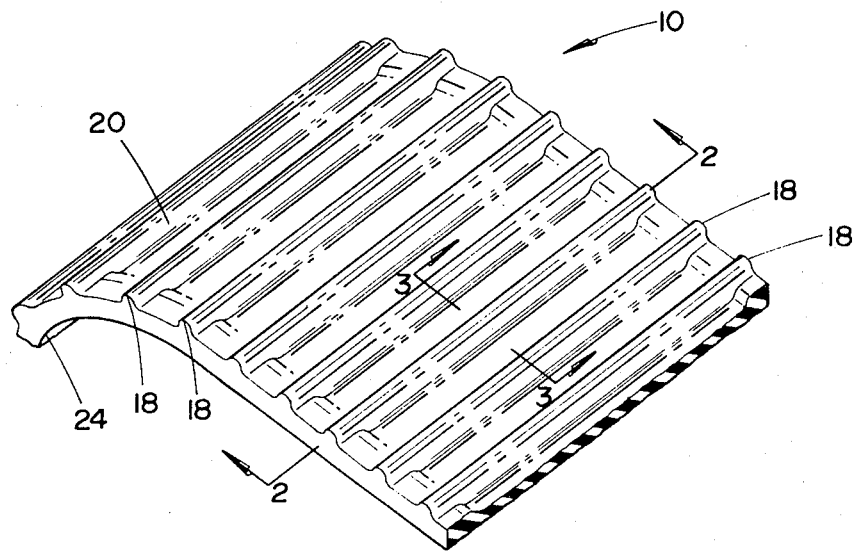
FIG. 1 is a isometric view of a portion of endless track incorporating the invention.
Figure 2:
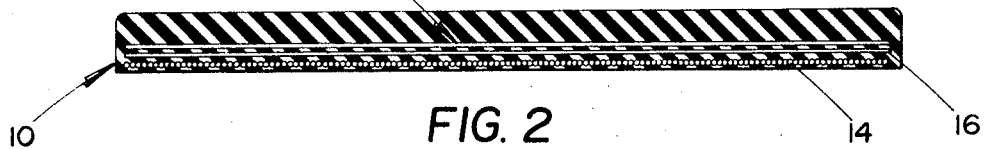
FIG. 2 is a view taken along the line 2—2 of FIG. 1.

Referring to FIGS. 1–4, an endless track 10 of the reinforced, polymeric type is provided that includes transverse reinforcement members or rods 12 of the invention. The track is made by known process and typically includes a textile tensile 14 and transverse 16 reinforcement section. A PLURALITY of spaced tread elements 18 are upraised from the outer surface 20 and extend transversely of the track. Preferably, the rods 12 are embedded in each transverse tread element 18 and extend substantially across the width of the track. Optionally, the rods 12 may be omitted from some of the tread elements or be embedded within the polymeric body 22 per se. The spacing of the rods is chosen to complement a drive means, not shown, for propelling the track from the inner surface 24 thereof.

Figure 3:
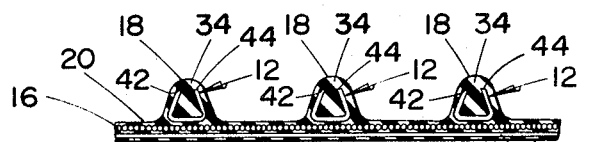
FIG. 3 is a view taken along the line 3—3 of FIG. 1 showing a plurality of rods of the invention in cross-section.
Figures 4, 5, 6, 7, 8:
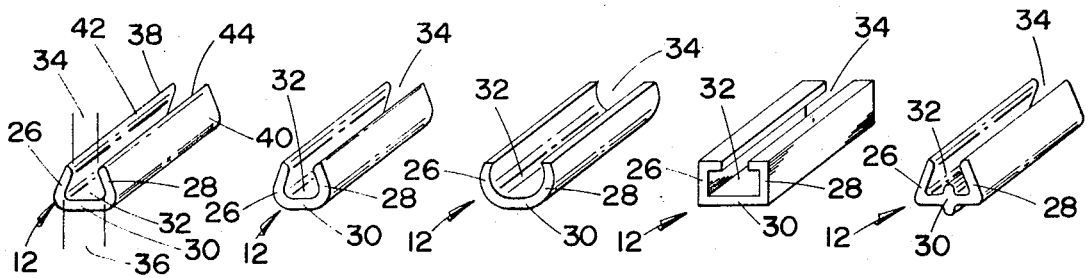
FIG. 4 is a partial isometric view of a preferable embodiment of the invention.
FIG. 5 is a view similar to FIG. 4 showing an alternate form of the invention.
FIG. 6 is a view similar to FIG. 4 showing an alternate form of the invention.
FIG. 7 is a view similar to FIG. 4 showing an alternate form of the invention.
FIG. 8 is a view similar to FIG. 4 showing an alternate form of the invention.
Figures 9, 10, 11:
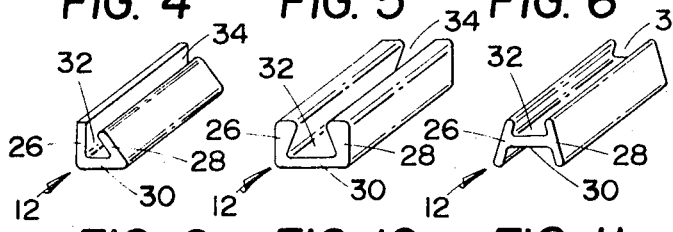
FIG. 9 is a view similar to FIG. 4 showing an alternate form of the invention.
FIG. 10 is a view similar to FIG. 4 showing an alternate form of the invention.
FIG. 11 is a view similar to FIG. 4 showing an alternate form of the invention.

Referring now more particularly to FIGS. 3 and 4, the reinforcement rod 12 of the invention is of special shape to mechanically interlock the rod within the polymeric material of the track. The rod 12 has two side portions 26, 28 which are spaced apart and extend from a base portion 30. Together, the base 30 and side portions 26, 28 define a rod cross-section of generally horseshoe shape defining a "dove tail opening" 32. As the opening 34 between the side portions 26, 28 is less than the maximum spacing 36 of the side portions, a geometric shape is formed that mechanically interlocks the rod within the polymeric body 22 of the track 10 in a somewhat "dove tail" fashion. Although the rod may be rotated to any position within its transverse orientation in relation to the track, it is preferred that the opening 34 of the "horseshoe" be oriented outwardly from the track.

Certain advantages are realized when the openings 34 of the rods are oriented outwardly. A primary advantage is that a double mechanical interlock is formed. One interlock is formed by the "horseshoe cross-section" or "dove tail opening" 32 of the rods. The dove tail opening 32 mechanically retains polymeric material and deters chunking of the polymeric material as the tread bars 18 wear with usage. A second mechanical interlock is formed as the polymeric material defines a reverse dove tail interlock with the outside surfaces 38, 40 of the rod 12 side portions 26, 28. Should the tread bars 18 wear down to the outside edges 42, 44 of the rods, the rods 12 will be mechanically retained by polymeric material adjacent thereto.

Another advantage realized by orienting the openings 34 outwardly is that only the edges 42, 44 of the side portions are exposed when the tread bar is worn away. The edges 42, 44 of the rod may wear without causing detrimental structural failure to the rod. Also, the track will have a better overall appearance when the edges are exposed as opposed to exposure of the entire base portion 30.

The general horseshoe shape of the reinforcing rods offers another advantage which helps maintain the rods within the polymeric body of the track. The rods may torsionally twist along their longitudinal axis to permit flexing or "giving" with the polymeric material as the track is used over irregular terrain. The torsional flexibility of the rod permits the polymeric material adjacent the rod to be torsionally flexed over the length of the rod as opposed to only a portion of the rod length. Thus, stress concentrations in the polymeric material adjacent the rod are substantially reduced.

The reinforcing rod may be made of any suitable material. However, it is preferable to use a non-metallic material. A metallic material typically takes a permanent "set" once the yield point has been reached. A permanent set in the rods results in distortion of the track. A material which does not take a permanent set and which has proven satisfactory as a reinforcement is a polymeric material reinforced with fiberglass.

ADDITIONAL SPECIES

Referring to FIGS. 5-11, alternate forms of rods 12 included within the scope of the invention are shown. All of the rods 12 are of generally horseshoe shape with a dove tail like opening 32 and include two side portions 26, 28 extending from and spaced apart by a base portion 30. The sides and base define a geometric shape mechanically interlocking the rod within the polymeric material of a track in a manner as previously described.

The foregoing detailed description is made for purpose of illustration only and is not intended to limit the scope of the invention which is to be determined from the appended claims.

What is claimed is:

1. In an integrally molded endless track of the textile reinforced polymeric type having inner and outer surfaces, the improvement comprising:
   a plurality of spaced reinforcing rods extending transversely substantially across the width of and embedded completely within the track, said rods having a generally horseshoe cross-section with converging sides throughout their length whereby said rods are mechanically interlocked throughout their length in a generally dove-tail manner within the polymer.

2. An endless track as set forth in claim 1 and further including a plurality of spaced tread elements extending transversely and upraised from the outer surface of the track, said reinforcing rods being disposed within said tread elements.

3. An endless track as set forth in claim 1 wherein the openings of the horseshoe cross-section of said rods are oriented substantially toward the outer surface of the track.

4. An endless track as set forth in claim 1 wherein said rods are of the fiberglass reinforced polymeric type.

* * * * *